(12) United States Patent
Brown

(10) Patent No.: US 9,256,976 B2
(45) Date of Patent: Feb. 9, 2016

(54) TECHNIQUES FOR EXTRACTING AND DISPLAYING PARTIALLY PROCESSED GRAPHICS INFORMATION

(71) Applicant: Intel Corporation, Santa Clara, CA (US)

(72) Inventor: Brian W. Brown, Sherwood, OR (US)

(73) Assignee: INTEL CORPORATION, Santa Clara, CA (US)

( * ) Notice: Subject to any disclaimer, the term of this patent is extended or adjusted under 35 U.S.C. 154(b) by 144 days.

(21) Appl. No.: 13/938,204

(22) Filed: Jul. 9, 2013

(65) Prior Publication Data

US 2015/0015579 A1    Jan. 15, 2015

(51) Int. Cl.
*G06T 1/20*   (2006.01)
*G06F 9/44*   (2006.01)
*G06T 15/00*  (2011.01)
*G06F 11/36*  (2006.01)

(52) U.S. Cl.
CPC .............. *G06T 15/005* (2013.01); *G06F 11/36* (2013.01); *G06F 11/3664* (2013.01)

(58) Field of Classification Search
None
See application file for complete search history.

(56) References Cited

U.S. PATENT DOCUMENTS

| | | | | |
|---|---|---|---|---|
| 7,671,862 | B1* | 3/2010 | Patel et al. | 345/501 |
| 8,134,566 | B1* | 3/2012 | Brown | G06T 15/04 345/501 |
| 2003/0009748 | A1* | 1/2003 | Glanville | G06T 1/20 717/140 |
| 2008/0094408 | A1* | 4/2008 | Yin | G06T 15/80 345/581 |
| 2012/0081377 | A1* | 4/2012 | Sowerby | G06F 11/3612 345/522 |
| 2013/0120380 | A1* | 5/2013 | Kallio et al. | 345/421 |
| 2013/0222399 | A1* | 8/2013 | Bourd et al. | 345/506 |
| 2014/0022264 | A1* | 1/2014 | Shreiner | 345/520 |
| 2014/0267318 | A1* | 9/2014 | Lum et al. | 345/506 |

* cited by examiner

*Primary Examiner* — Jacinta M Crawford
(74) *Attorney, Agent, or Firm* — Kacvinsky Daisak Bluni PLLC

(57) ABSTRACT

Various embodiments are generally directed to an apparatus, method and other techniques receiving graphics information in a graphics processing stream and applying vertex processing and topology processing to the graphics information in the graphics processing stream to generate vertex information and topology processing information. The vertex information associated with the graphics processing stream may be identified based on one or more identifiers and sent from the graphics processing stream to a buffer for a display controller.

24 Claims, 10 Drawing Sheets

600

RECEIVE GRAPHICS INFORMATION IN A GRAPHICS PROCESSING STREAM
605

APPLY VERTEX PROCESSING TO THE GRAPHICS INFORMATION IN THE GRAPHICS PROCESSING STREAM TO GENERATE VERTEX INFORMATION
610

IDENTIFY VERTEX INFORMATION ASSOCIATED WITH THE GRAPHICS PROCESSING STREAM BASED ON ONE OR MORE IDENTIFIERS
615

DISPLAY THE VERTEX INFORMATION FROM THE GRAPHICS PROCESSING STREAM ON A DISPLAY
620

*FIG. 6*

TECHNIQUES FOR EXTRACTING AND DISPLAYING PARTIALLY PROCESSED GRAPHICS INFORMATION

TECHNICAL FIELD

Embodiments described herein generally relate to processing graphics information by a graphics processing unit. In particular, embodiments relate to extracting and displaying partially processed graphics information processed by a graphics processing unit in a graphics processing stream.

BACKGROUND

In a typical graphics processing system, the processing elements, such as vertices and/or pixels, are processed through multiple stages providing for the processing of graphics information including application of textures and other processing instructions. These stages include transforming a three-dimensional image into a two-dimensional screen. Graphics rendering is like a manufacturing assembly line with each stage adding something to the previous one in a pipeline architecture.

Generally, each of these stages is programmed individually to complete a particular processing task. However during processing of the image, these stages act as a single "black box." The graphics information enters the pipeline or processing stream, and is processed by the various stages. The graphics information is then displayed on the display. Typically, a programmer or developer has no insight into each of the intermediate stages of the pipeline or processing stream, and only can see the input into the stream and the output to be displayed on a display. However during development of applications, programmers or developers desire insight into information processed during these stages.

BRIEF DESCRIPTION OF THE DRAWINGS

FIG. 6 illustrates an embodiment of a third logic flow diagram.

DETAILED DESCRIPTION

Figure 1:
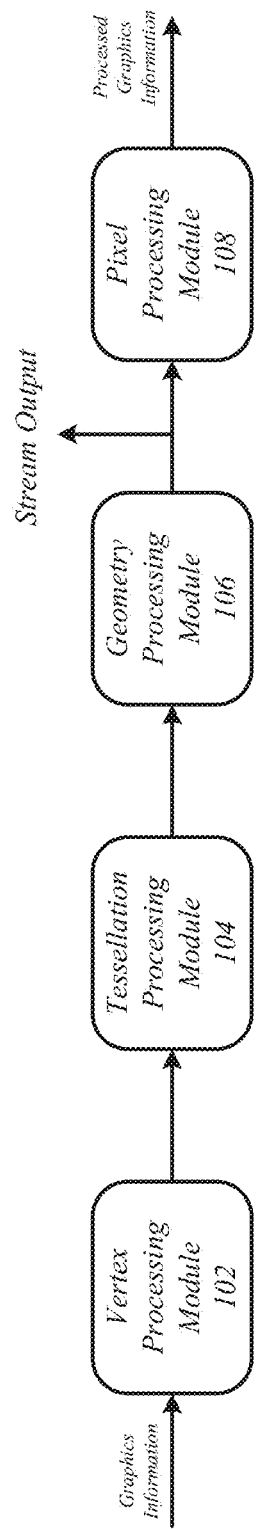
FIG. 1 illustrates an embodiment of a graphics processing pipeline.

Various embodiments are generally directed to an apparatus, system and method for extracting and displaying partially processed graphics information processed by a graphics processing unit in a graphics processing stream. As will be described in more detail below an object for displaying may enter the graphics processing stream and may be processed through one or more modules of a graphics processing pipeline for displaying on a display. As previously discussed, this process does not generally afford a developer or programmer the capability to view graphics information as it is being processed through the graphics processing pipeline. The graphics processing pipeline generally acts like a black box where graphics information enters the pipeline, graphics processing is applied, and the result of the processing is displayed.

This block box approach may work fine for an end user of the product who is only concerned with the finish product output. However, a developer may want to explore the output of each of the various processing stages during development stages of the product. For example, a bug or an error in programming may generate an improper rendering of an object. This error may occur in various parts of the graphics processing pipeline and a developer, in an effort to correct the error, would like to see the outputs of the various processing stages.

In various embodiments, to extract information from the various stages of the graphics processing pipeline, pseudo processing modules may replace or substitute actual processing modules subsequent to the stage where the information extraction is desired. For example, a graphics processing pipeline may include a vertex processing stage, a tessellation processing stage, a geometry processing stage and a pixel processing stage. If vertex information is desired, the graphics information may be processed by a vertex processing module and a tessellation processing module may be replaced with a pseudo-tessellation processing module to identify the vertex information in the graphics processing stream. Further, a geometry processing module may be replaced by a pseudo-geometry processing module that may receive the vertex information and, at this point, send the vertex information to a buffer for displaying as a graphical image. In this example, the pixel processing stage does not receive or process the graphics information, the vertex information is sent to the display before the pixel processing stage.

In another example, a developer may desire to see the output of the tessellation processing stage. In this example, the graphics information may be sent through and processed by the vertex processing module and the tessellation processing module. However, in this case, the geometry processing module may be replaced by a pseudo-geometry processing module to identify the tessellation information and send it to a buffer for displaying as a graphical image.

Prior attempts to debug the various stages of the graphics processing pipeline generally consist of running a software emulation of a graphics processing unit and investigating the data buffers in between each stage. However, emulated devices do not always behave exactly the same as the target hardware and often process the information slowly. The approach of replacing processing stages or modules with pseudo processing modules provides an advantage over prior debugging techniques by increasing the speed of processing during the debugging phase of production and providing a realistic environment in which the debugging can be performed. These advantages and other features will become more apparent to one skilled in the art in view of the following discussion and figures.

With general reference to notations and nomenclature used herein, the detailed description that follows may be presented in terms of program procedures executed on a computer or network of computers. These procedural descriptions and representations are used by those skilled in the art to most effectively convey the substance of their work to others skilled in the art.

A procedure is here and is generally conceived to be a self-consistent sequence of operations leading to a desired result. These operations are those requiring physical manipulations of physical quantities. Usually, though not necessarily, these quantities take the form of electrical, magnetic or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, the manipulations performed are often referred to in terms, such as adding or comparing, which are commonly associated with mental operations performed by a human operator. No such capability of a human operator is necessary, or desirable in most cases, in any of the operations described herein that form part of one or more embodiments. Rather, the operations are machine operations. Useful machines for performing operations of various embodiments include general-purpose digital computers or similar devices.

Various embodiments also relate to apparatus or systems for performing these operations. This apparatus may be specially constructed for the required purpose or it may comprise a general-purpose computer as selectively activated or reconfigured by a computer program stored in the computer. The procedures presented herein are not inherently related to a particular computer or other apparatus. Various general-purpose machines may be used with programs written in accordance with the teachings herein, or it may prove convenient to construct more specialized apparatus to perform the required method. The required structure for a variety of these machines will appear from the description given.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well-known structures and devices are shown in block diagram form in order to facilitate a description thereof. The intention is to cover all modifications, equivalents, and alternatives consistent with the claimed subject matter.

FIG. 1 illustrates an embodiment of graphics processing pipeline 100 to process graphics information and includes but is not limited to a vertex processing module 102, a tessellation processing module 104, a geometry processing module 106 and a pixel processing module 108. The graphics processing pipeline 100 including its processing modules may be stored in memory and may be executed on any processing circuit or graphics processing unit such as the elements discussed in FIGS. 7 and 8. Furthermore, the graphics processing pipeline 100 may be implemented in software, hardware or any combination thereof.

In some embodiments, graphics information may enter the graphics processing stream and the graphics processing pipeline 100 may receive information from one or more applications, such as a gaming application, a computer-aided drafting application, a video editing application, an image editing application, a three-dimensional (3D) modeling application, an animation application, or any application that may require graphics processing to display information. FIG. 1 shows a limited number of processing modules. However, various embodiments are not limited in this manner and the graphics processing pipeline 100 may include any number of processing modules to process graphics information. Moreover, FIG. 1 illustrates the graphics processing pipeline 100 as a linear operation, however, each of the processing modules may process or execute in a parallel processing fashion.

In various embodiments, the vertex processing module 102 may receive graphics information in a graphics processing stream for processing an object of a frame or image and may be in response to the application requesting processing of the object or image. The graphics information may include information from a vertex buffer, an index buffer, a constant buffer, or any combination thereof. In some embodiments, the vertex processing module 102 may retrieve this information from the one or more buffers in response to a request by the application. The graphics information may include one or more of point data, line data, plane data, circle data, triangle data, spline curve data, hue data, and color data. The graphics information may include polygon data or triangle data including one or more vertices or points in a three-dimensional (3D) space for processing by the graphics processing pipeline 100. The one or more vertices may be combined or connected to create one or more polygons, such as a triangle to create the object. The graphics information may also include information describing the object, such as the color, hue, and texture.

In some embodiments, the vertex processing module 102 may include one or more vertex shaders to process the graphics information and output the processed graphics information as vertex information. The vertex information may include vertex control points, mesh information and other information relating to vertices to create a polygon. The vertex processing module 102 may be used to manipulate objects in a 3D environment or space by performing mathematical operations on the objects' graphics information to generate the vertex information. For example, the vertex processing module 102 may apply a shading effect such as matrix palette skinning, which allows programmers to create realistic effects using a skeletal animation. In another example, the vertex processing module 102 may process graphics information to deform surfaces such as creating water that ripples. In a third example, the vertex processing module 102 may conduct vertex morphing, which is used to morph triangle meshes from one shape to another, providing smooth skeletal animation. Once these effects are applied or executed on the graphics information, the vertex processing module 102 may output graphics information including vertex information. Further, various embodiments are not limited to the above-recited examples, and the vertex processing module 102 may manipulate objects in any manner.

In various embodiments, the graphics processing pipeline 100 may include a tessellation processing module 104 for applying tessellation processing to the graphics information including the vertex information. The tessellation processing module 104 may receive the graphics information and vertex information from the vertex processing module 102 or retrieve the information from one or more of the previously described buffers. The tessellation processing module 104 may subdivide one or more polygons, triangles or shapes created by the vertices to make additional, smaller polygons to provide more detail for the object. In various embodiments, the tessellation processing module 104 may include one or more shaders, such as a hull shader, a domain shader and a tessellation generator for a DirectX® environment, and a tessellation control shader, tessellation evaluation shader and a primitive generator for an OpenGL® environment. The tessellation processing module 104 may process the graphics information including vertex information and output tessellation information including new vertices to create additional polygons. The tessellation processing module 104 may send the graphics information including the vertex information and the tessellation information to the geometry processing module 106 of the graphics processing pipeline 100.

In various embodiments, the geometry processing module 106 may receive the graphics information including the vertex information and tessellation information in the processing stream from the tessellation processing module 104 or retrieve the graphics information from the one or more buffers. The geometry processing module 106 may apply geometry processing to the graphics information. However, in some embodiments, the graphics processing pipeline 100 may not include a tessellation processing module 104 or tessellation processing may not be enabled and the geometry processing 106 may receive graphics information only including vertex information from the vertex processing module 102. In these embodiments, the geometry processing module 106 may only apply geometry processing to the vertex information.

The geometry processing module 106 may include one or more geometry shaders to generate new graphics primitives, such as points, lines, and triangles for the object as graphics information. For example, a series of line strips representing control points for a curve are passed to the geometry shader and depending on the complexity required the geometry shader can automatically generate extra lines, each of which provides a better approximation of a curve. The geometry shader may output geometry information including multiple vertices forming a single selected topology, such as tristrip, linestrip, and pointlist. Generally, the graphics information including the vertex information, tessellation information and the geometry information may be sent to a rasterization stage such as the pixel processing module 108 or may be sent to one or more buffers via a stream output stage or command to be fed back into the graphics processing pipeline 100 or for displaying. As will be discussed in more detail below, the stream output stage or command may be used to gather each of the vertex information, tessellation information, and geometry information for displaying on a display. The stream output stage or command may be configured to record all of the position data, including all of the triangles, lines, points, etc. output from the geometry processing module 106 to a buffer.

In some embodiments, the graphics processing pipeline 100 may include a pixel processing module 108 to compute color and other attributes for the graphics information. The pixel processing module 108 may include one or more pixel shaders and receive graphics information including the processed vertex information, tessellation information and geometry information from the geometry processing module 106. The pixel processing module 108 may then perform pixel shading operations on the graphics information on a per pixel basis. For example, the pixel processing module 108 may render, light, shade or color each pixel of an object or a frame for output to a display. Once the pixel processing module 108 completes processing the graphics information, the object may be displayed on a display fully processed including vertex processing, tessellation processing (if enabled), geometry processing and pixel processing.

Figure 2A:
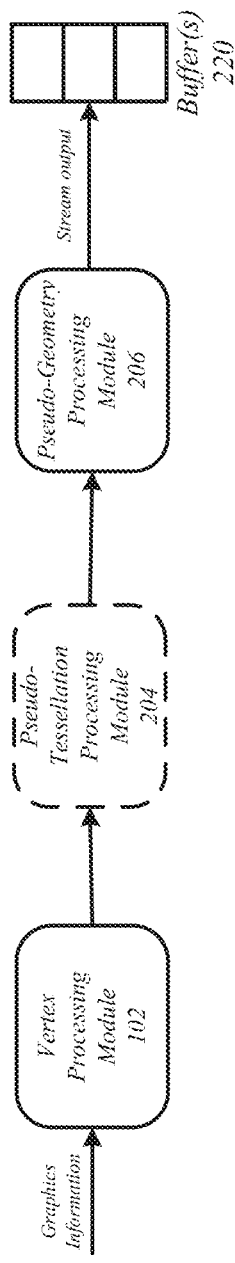
FIGS. 2A-2C illustrate embodiments of a graphics processing pipeline for extracting partially processed graphics information.

FIG. 2A illustrates an exemplary embodiment of a graphics processing pipeline 200 for extracting and displaying only partially processed graphics information. The graphics processing pipeline 200 including its processing modules may be stored in memory and execute on any processing circuit or graphics processing unit such as the elements discussed in FIGS. 7 and 8. Furthermore, the graphics processing pipeline 200 may be implemented in software, hardware or combination thereof.

In various embodiments, only the vertex processing module 102 applies processing to the graphics information as described above with respect to FIG. 1. FIG. 2A illustrates the graphics processing pipeline 200 including a vertex processing module 102, an optional pseudo-tessellation processing module 204 (if tessellation processing is enabled), a pseudo-geometry processing module 206 and one or more buffers 220.

In various embodiments, the vertex processing module 102 may be the same as previously described with respect to FIG. 1. The vertex processing module 102 may include one or more vertex shaders to process the graphics information and output the processed graphics information as vertex information. The vertex processing module 102 may be used to manipulate objects in a 3D environment or space by performing mathematical operations on the objects' graphics information to generate the vertex information, as previously discussed. The vertex processing module 102 may retrieve graphics information from one or more buffers including a vertex buffer, an index buffer, a constant buffer, or any combination thereof. In some embodiments, the vertex processing module 102 may receive the graphics information in a processing stream. The graphics information including the vertex information may then be sent to the pseudo-geometry processing module 206 or stored in buffers.

In various embodiments, processing pipeline 200 may include a pseudo-tessellation processing module 204 if tessellation processing is enabled. However, in some embodiments, tessellation processing may not be enabled and a pseudo-tessellation processing module 204 is not needed.

If the tessellation processing is enabled, the pseudo-tessellation processing module 204 identifies the vertex information based on one or more identifiers and passes the vertex information to the pseudo-geometry processing module 206. For example, the vertex information may include tags or indicators that may identify particular graphics information as vertex information. The information may be identified by the pseudo-tessellation processing module 204 in one or more buffers, e.g., vertex buffer, index buffer, constant buffer, etc., or in the processing stream. The tags may label or indicate graphics information as processed vertex information. The pseudo-tessellation processing module 204 does not apply tessellation processing on the graphics information, but passes the vertex information pass to a pseudo-geometry processing module 206 and the vertex information may be sent to buffer(s) 220 via a stream output stage or command for displaying as a graphical image.

In some embodiments, tessellation processing may not be enabled and the pseudo-geometry processing module 206 may receive graphics information from the vertex processing module 102 and identify the vertex information based on one or more identifiers, as described above. The pseudo-geometry processing module 206 may then pass the vertex information to buffer(s) 220 via the stream output stage or command. Once the vertex information is in buffer(s) 220, the object may be displayed on the display, illustrating the effects of the output of the vertex processing module 106 as a graphical image. Thus, a developer may then use this output to determine if the vertex processing module 106 is causing an error.

Figure 2B:
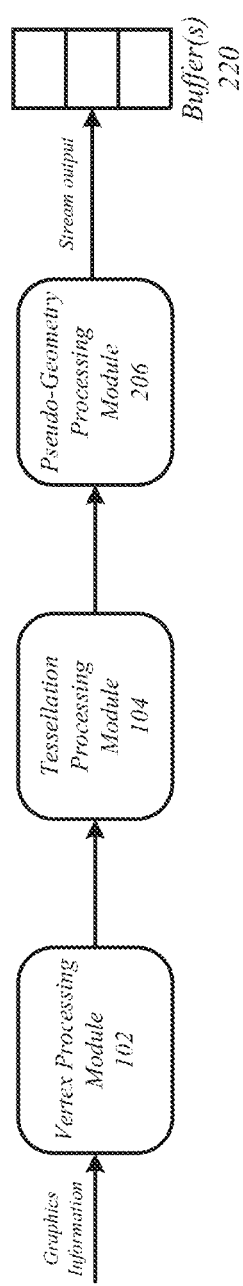

FIG. 2B illustrates a second exemplary embodiment of graphics processing pipeline 200 for extracting and displaying only partially processed graphics information. In this exemplary embodiment, tessellation information may be extracted from the graphics information for displaying. The graphics processing pipeline 200, in this example, may include a vertex processing module 102, a tessellation processing module 104, a pseudo geometry processing module 206 and buffer(s) 220.

In various embodiments, the vertex processing module 102 and the tessellation processing module 104 may be the same as the previously discussed processing modules in FIG. 1. For example, the vertex processing module 102 may receive or retrieve graphics information and output graphics information including vertex information, as previously discussed. The tessellation processing module 104 may then receive or retrieve the graphics information and apply tessellation processing to it. For example, the tessellation processing module 104 may subdivide one or more polygons, triangles or shapes created by vertices to make additional, smaller polygons to provide more detail for an object. The tessellation processing module 104 may then output graphics information including vertex information and tessellation information to the pseudo-geometry processing module 206 and/or into one or more buffers, e.g. vertex buffer, index buffer, constant buffer, etc.

In this exemplary embodiment, the pseudo-geometry processing module 206 may identify the tessellation information based on one or more identifiers. In various embodiments, these one or more identifiers may be one or more tags or indicators identify graphics information and vertex information processed by the tessellation processing module 104. The pseudo-geometry processing module 206 may then send the tessellation information to buffer(s) 220 via a stream output stage or command. Buffer(s) 220 may then be read for displaying the graphics information of the object on a display as a graphical image.

Figure 2C:
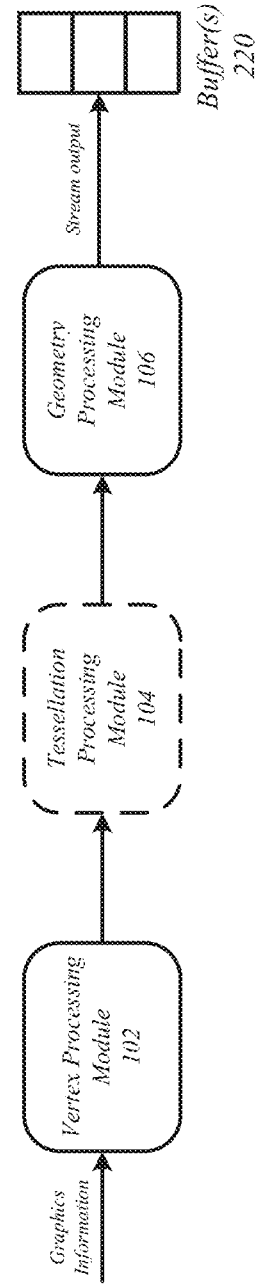

FIG. 2C illustrates a third exemplary embodiment of graphics processing pipeline 200 for extracting and displaying only partially processed graphics information. In this exemplary embodiment graphics processing pipeline 200 may include a vertex processing module 102, an optional tessellation processing module 104, a geometry processing module 106, and buffer(s) 220. In this example, geometry information may be extracted and displayed on a display as a graphical image. As previously discussed, the vertex processing module 102 may process graphics information generating vertex information, the tessellation processing module 104 may then process the graphics information including the vertex information and generate tessellation information. The graphics information including the vertex information and the tessellation information may be received or retrieved by the geometry processing module 106 to apply geometry processing. For example, the geometry processing module 106 may generate new graphics primitives, such as points, lines, and triangles for an object.

In this exemplary embodiment, the geometry module 106 may then send the geometry information to buffer(s) 220 via the stream output stage or command for displaying. The buffer(s) 220 may then be read and a display of the object may be displayed.

In various implementations, the exemplary embodiments of FIGS. 2A-2C may be executed on an individual basis or as part of a looping sequence as will be discussed in more detail below with respect to FIGS. 3 and 4. Furthermore, FIGS. 2A-2C show a limited number of processing modules to process graphics information. However, various embodiments are not limited in this manner and the processing pipeline 200 may include any number of modules to process the graphics information. In these embodiments, pseudo processing modules may replace processing modules to pass various information through the processing pipeline and utilize the stream output stage of the geometry processing module 106 or pseudo-geometry processing module 206.

Figure 3:
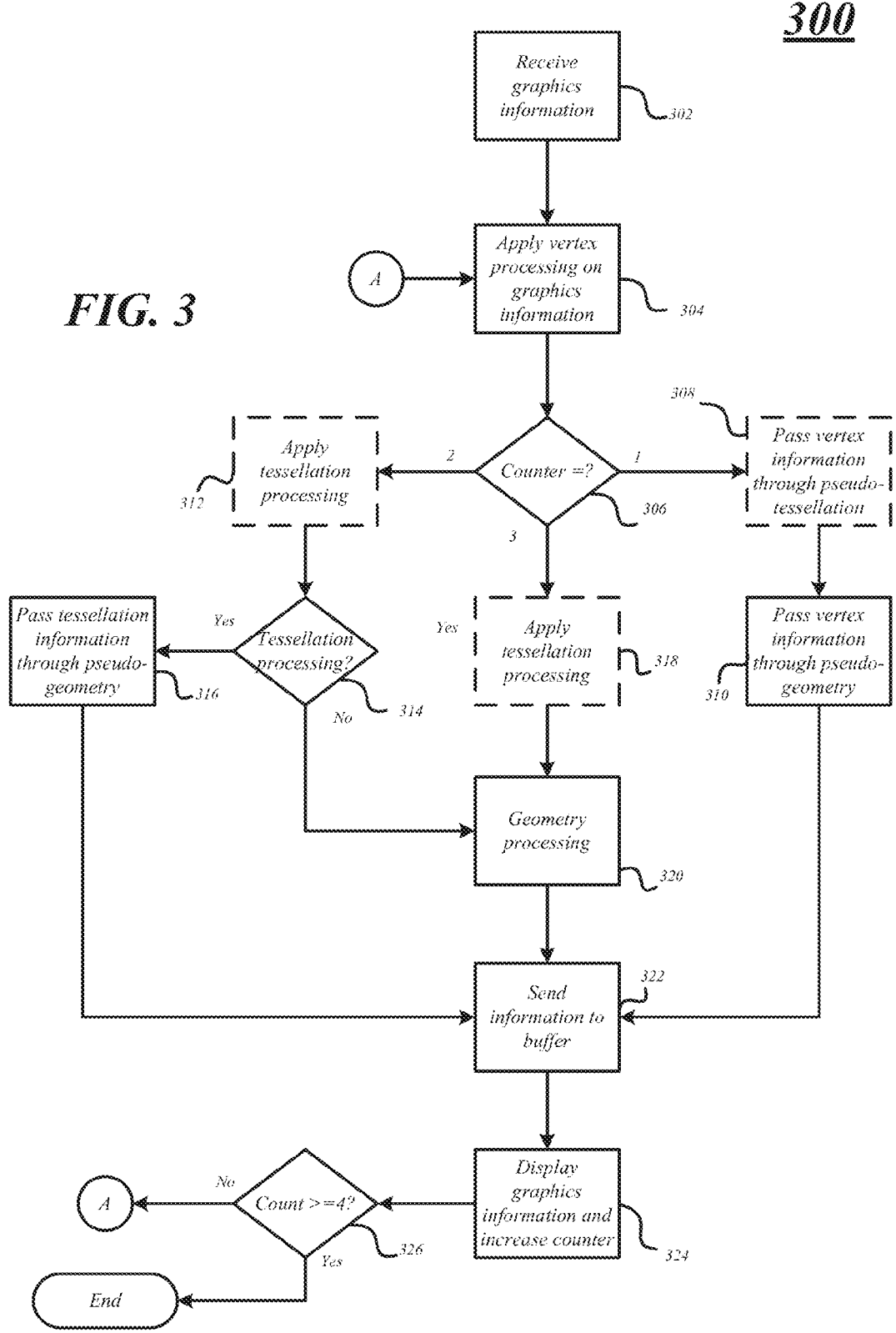
FIG. 3 illustrates an embodiment of a first logic flow diagram.

FIG. 3 illustrates an exemplary embodiment of first logic flow 300 for extracting and displaying partially processed graphics information in a graphics processing pipeline. In various embodiments, the first logic flow 300 may be conducted as loop to extract vertex information, tessellation information and geometry information for displaying. The first logic flow 300 may be controlled by one or more controllers, processors, and processing circuits. For clarity purposes, the logic flow is discussed with reference to the graphics processing pipelines of FIGS. 1 and 2.

At block 302, a vertex processing module 102 may receive graphics information for processing for an object or image of a frame. The graphics information may be received by an application, as previous discussed, requesting processing by the graphics processing pipeline 100, 200. In various embodiments, the vertex processing module 102 may retrieve the graphics information from one or more buffers including the vertex buffer, index buffer and constant buffer at block 302. The vertex processing module 102 may apply vertex processing on the graphics information and generate vertex information at block 304. For example, The vertex processing module 102 may be used to manipulate objects in a 3D environment or space by performing mathematical operations on the objects' graphics information to generate the vertex information.

At decision block 306 a counter is checked and if the counter is equal to 1 indicating that this is the first pass through logic flow 300, the processing flow proceeds to block 308. If the counter is equal to 2, indicating that this is the second pass through logic flow 300, the processing flow proceeds to block 312 and if the counter is equal to 3, indicating that this is the third pass through logic flow 300, the processing flow proceeds to block 318. In various embodiments, the counter may be initiated to 1 at the beginning of logic flow 300; however, various embodiments are not limited in this manner. The counter may use any integer numbers for purposes of determining which pass the processing flow is on. For example, the counter may be initiated to 0, and (0, 1, 2) and may be used to determine the pass. If the at block 306 the counter is greater than 3, the logic flow 300 may exit. In some embodiments, the processing pipeline may include more or less than three modules and the counter can be set based on the number of processing modules in the processing pipeline.

At optional block 308, the graphics information including the vertex information may be passed through the pseudo-tessellation processing module 204. Further, at optional block 308, the pseudo-tessellation processing module 204 may identify the vertex information in the graphics information based one or more identifiers to pass through to the next stage of the processing pipeline. At optional block 308, tessellation processing is not performed on the graphics information.

The pseudo-geometry processing module 206 may receive the vertex information from the pseudo-tessellation processing module 204 and pass the information through to one or more buffers at block 310. Further, at block 322, the vertex information may be sent to one or more buffers via a stream output stage or command.

If the processing flow 300 is on its second pass, tessellation processing is applied to the graphics information by a tessellation processing module 104 if tessellation processing is enabled at optional block 312. Further, the tessellation processing module 104 may produce tessellation information at block 312, as previously described with respect to FIGS. 1 and 2.

If at decision block 314, tessellation processing is applied, the graphics information is passed to a pseudo-geometry processing module 206 at block 316. The pseudo-geometry processing module 206 may identify the tessellation information in the graphics information based on one or more identifiers. The tessellation information may be sent to one or more buffers via the stream output stage or command at block 322 for displaying as a graphical image.

However, at decision block 314 if tessellation processing has not been applied and tessellation processing is not enabled, the graphics information including vertex information is passed to a geometry processing module 106 to apply geometry processing at block 320. The geometry information may then be sent to one or more buffers via the stream output stage or command at block 322 for displaying as a graphical image.

If at decision block 306 the counter is equal to 3 or if this is the third pass through the processing flow, the logic flow 300 proceeds to optional block 318 and tessellation processing is applied to the graphics information including vertex information by the tessellation processing module 104 if tessellation processing is enabled. The graphics information is then passed to the geometry processing module 106 and geometry processing is applied to the graphics information at block 320. The geometry information is sent to one or more buffers via the stream output stage or command at block 322 for displaying as a graphical image.

At bock 324, the graphics information is read from the buffer and displayed on one or more displays and the counter is incremented by 1. During each pass of the logic flow 300, the graphics information may be read from the buffer and displayed on the one or more displays as a separate graphic in one or more sections of the display showing each stage of the processing pipeline, as will be discussed in further detail with respect to FIGS. 5A-5C. For example, after the first pass, the object will be displayed illustrating graphics information including vertex processing. After the second pass, the object will be displayed illustrating tessellation information (or geometry information if tessellation processing is not enabled) and after the third pass, the object will be displayed illustrating geometry information.

At decision block 326 if the counter is greater than or equal to 4 the logic flow 300 will exit. However if the counter is less than 4, the logic flow 300 will loop back to block 304 and complete another pass as described above.

Figure 4:
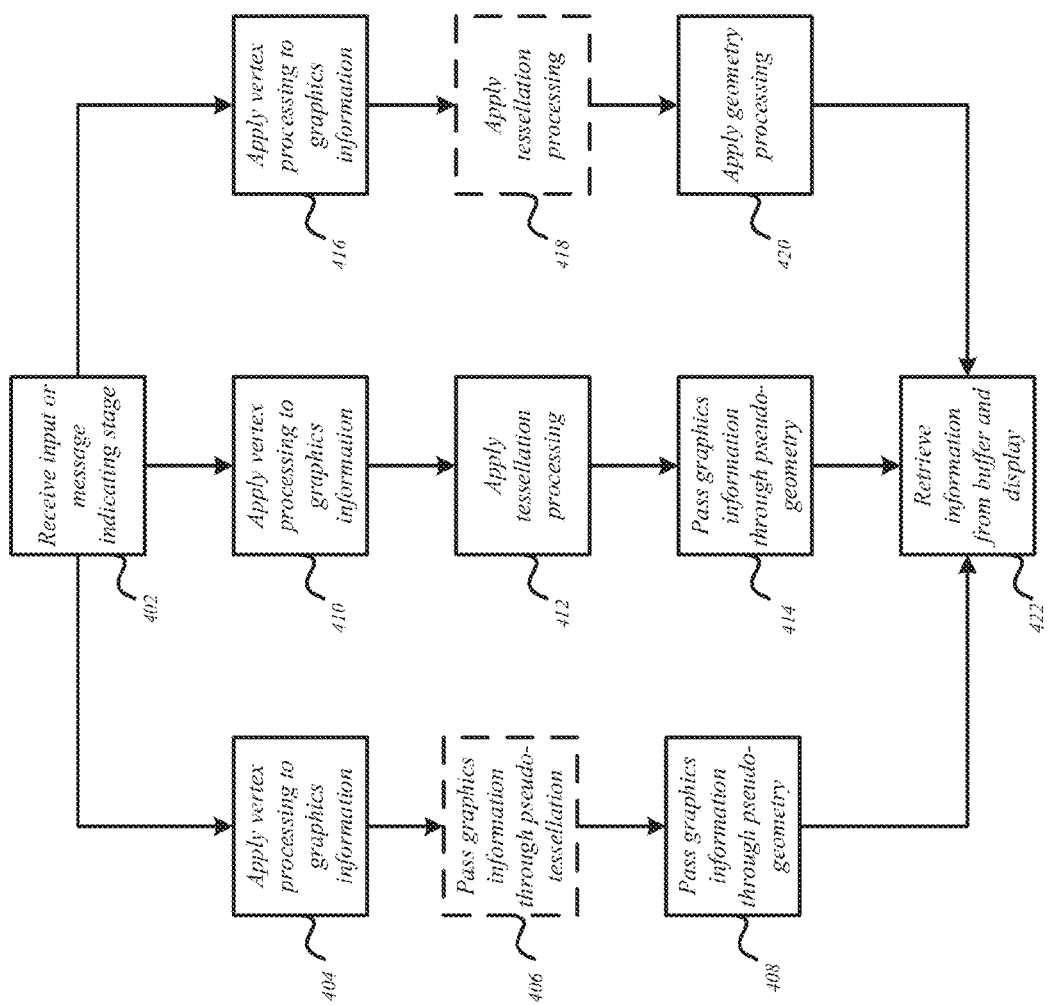
FIG. 4 illustrates an embodiment of a second logic flow diagram.

FIG. 4 illustrates an exemplary embodiment of second logic flow 400 for extracting and displaying partially processed graphics information in a graphics processing pipeline. In the second logic flow 400, a determination may be made as to which of the processing stages are desired for extraction and displaying. For clarity purposes, the logic flow is discussed with reference to the graphics processing pipeline of FIGS. 1 and 2.

At block 402, an input may be received indicating which of the processing pipeline stages or modules are desired for extracting information and displaying the information. For example, a determination may be made by a developer or programmer wanting to extract vertex information after the vertex processing stage or module and thus may indicate as such using one or more inputs received by a processing circuit. In another example, the developer may desire to extract tessellation information after the tessellation processing stage and may indicate as such using the one or more inputs. In various embodiments, the developer or programmer may make a selection via an input using a graphical user interface (GUI) on the display, a button, a keyboard, track pad, or any other input device. The developer may select to extract data from any of the processing stages via the input device.

In some embodiments, a message may be received by a processing circuit from one the graphics processing modules indicating that error has occurred and the information generated by the processing module causing the error is desired for extraction and displaying. The graphics processing pipeline 100 may process graphics information through the pipeline and an error may be generated during one of the stages. The processing module processing the graphics information at the time of the error may generate a message indicating an error has occurred. The processing circuit may receive the message and make a determination which of the processing modules caused the error based on the message. For example, an error may occur during the processing of the graphics information in by the vertex processing module 102 and the module may generate a message indicating that the error occurred. The message may be sent to the processing circuit which in turn configures the graphics processing pipeline to extract information after the vertex processing module using one or more of a pseudo-tessellation processing module, a pseudo-geometry processing module and the stream output stage or command. Various embodiments are not limited to this example and information may be extracted for display from any of the processing modules in this manner.

In one or more embodiments, the one or more processing circuits may determine that vertex information needs to be extracted from the graphics processing pipeline 200 based on an input or a message. As a result, at block 404, the vertex processing module 102 applies vertex processing to the graphics information to generate vertex information. The graphics information including the vertex information may then be sent to or retrieved by a pseudo-tessellation processing module 204 if tessellation processing is enabled, at optional block 406. The pseudo-tessellation processing module 204 may identify the vertex information via one or more identifiers and pass the identified vertex information to the pseudo-geometry processing module 206. The pseudo-tessellation processing module 204 does not apply any tessellation processing to the graphics information.

At block 408, the pseudo-geometry processing module 206 may receive the vertex information and may it to a buffer(s) 220 via a stream output stage or command. The buffer may receive the vertex information and the information may be retrieved from the buffer for displaying at block 422. In this example, the object displayed on the display will only include vertex information and will not have tessellation information and geometry information. Therefore, a developer may determine what is causing an error in the processing by the vertex processing module 102. In various embodiments, a developer may extract the vertex information from the buffer(s) 220 based on identified vertex information and apply other debugging techniques to determine what is causing the error without displaying the vertex information on the display.

In some embodiments, the one or more processing circuits may determine that tessellation information needs to be extracted from the graphics processing pipeline 200 based on an input or a message. At block 410, a vertex processing module 102 may receive graphics information of an object from an application and may apply vertex processing to the object. The vertex processing module 102 may generate vertex information during the processing of the graphics information. The graphics information including the vertex information may then be passed to a tessellation processing module 104 to apply tessellation processing to the graphics information. In some embodiments, the tessellation processing module 104 may retrieve the graphics information from one or more buffers, as previously discussed.

At block 412, the tessellation processing module 104 may apply tessellation processing, as previously described, to the graphics information to generate tessellation information. The graphics information including the vertex information and the tessellation information may then be sent to a pseudo-geometry processing module 206.

In some embodiments, the pseudo-geometry processing module 206 may receive or retrieve the graphics information and identify the tessellation information based on one or more identifiers, at block 414. The pseudo-geometry processing module 206 may then send the tessellation information to a buffer(s) 220 via the stream output stage or command.

In this example, the tessellation information may be retrieved from the buffer(s) 220 and displayed on a display for a developer to view. In various embodiments, a developer may extract the tessellation information from the buffer(s) 220 based on identified tessellation information and apply other debugging techniques to determine what is causing the error without displaying the tessellation information on a display.

In some embodiments, the one or more processing circuits may determine that geometry information needs to be extracted from the graphics processing pipeline 200 based on an input or a message. At block 416, a vertex processing module 102 may receive graphics information of an object from an application and may apply vertex processing to the object. The vertex processing module 102 may generate vertex information during the processing of the graphics information. The graphics information including the vertex information may then be passed to a tessellation processing module 104 to apply tessellation processing to the graphics information if tessellation processing is enabled. However if tessellation processing is not enabled, the graphics information may be sent directly to a geometry processing module 106 to apply geometry processing to the graphics information.

At optional block 418, the tessellation processing module 104 may apply tessellation processing, as previously described, to the graphics information to generate tessellation information. The graphics information including the vertex information and the tessellation information may then be sent to the geometry processing module 106.

In some embodiments, the geometry processing module 106 may receive or retrieve the graphics information including the vertex information and tessellation information (if enabled) and apply geometry processing to the graphics information to generate geometry information, at block 420. The geometry processing module 106 may then send the geometry information to a buffer(s) 220 via the stream output stage or command.

In this example, the geometry information may be retrieved from the buffer(s) 220 and displayed on a display for a developer to view. In various embodiments, a developer may extract the geometry information from the buffer(s) 220 based on one or more identifiers and apply other debugging techniques to determine what is causing the error without displaying the geometry information on a display.

Figure 5A:
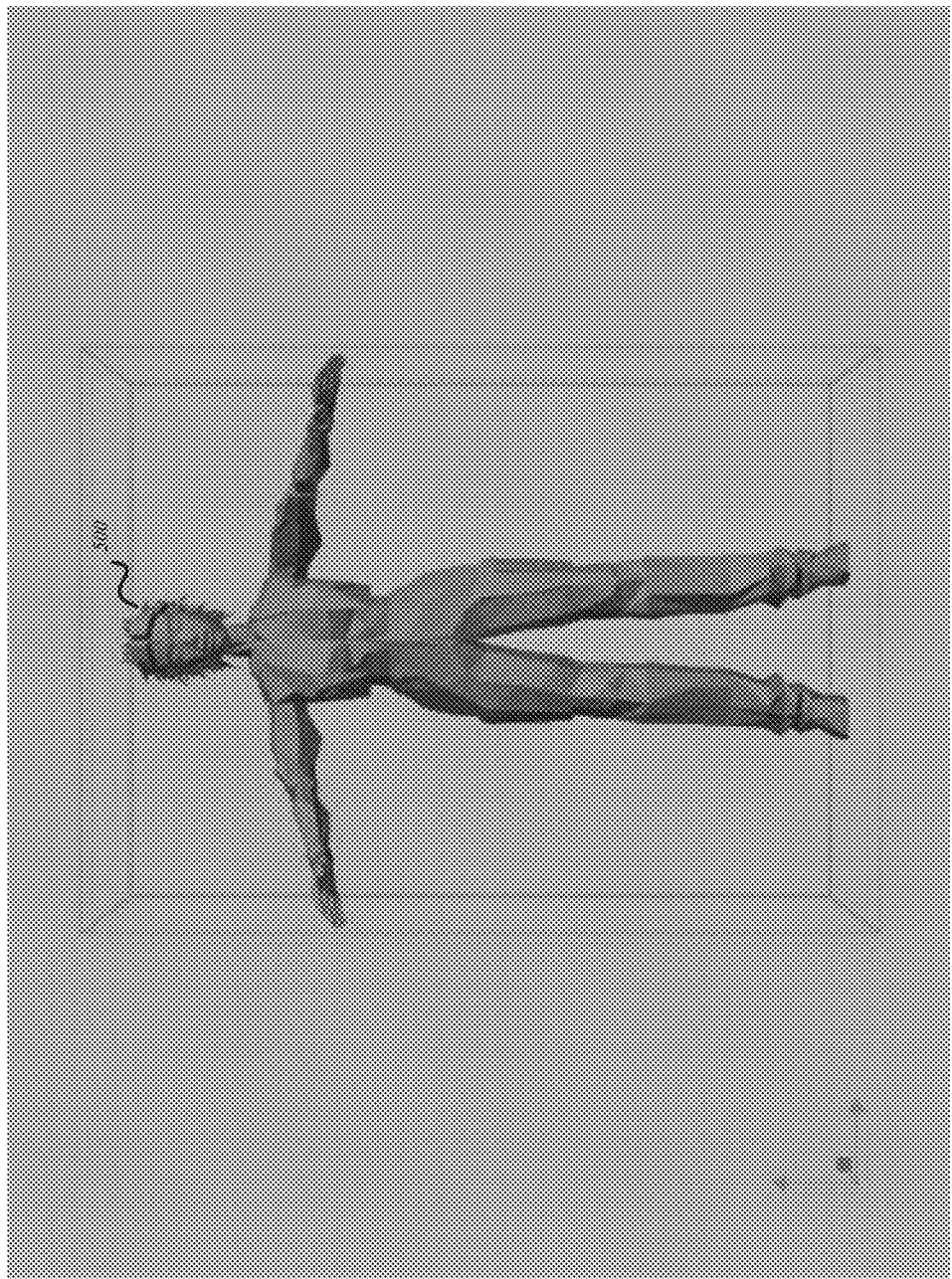
FIGS. 5A-5C illustrate exemplary embodiments of a partially processed object.

FIG. 5A illustrates an exemplary embodiment of object 500 after applying vertex processing. In this example, graphics information including polygon data or triangle data including one or more vertices or points in a three-dimensional (3D) space for processing may have been received by a vertex processing module 102. The graphics information may also include information describing the object, such as the color, hue, and texture. The one or more vertices of the graphics information may be combined or connected to create one or more polygons, such as a triangle to create the object. In this example, the graphics information includes information for a character object from a video game.

In some embodiments, the vertex processing module 102 including one more vertex shaders may process the graphics information including manipulating the character object in a 3D environment or space by performing mathematical operations on the objects' graphics information to generate the vertex information. The vertex processing module 102 may apply the vertex processing to graphics information and generate vertex information which may then be passed through an optional pseudo-tessellation processing module 204, a pseudo-geometry processing module 206, and displayed on a display as shown in FIG. 5A.

Figure 5B:
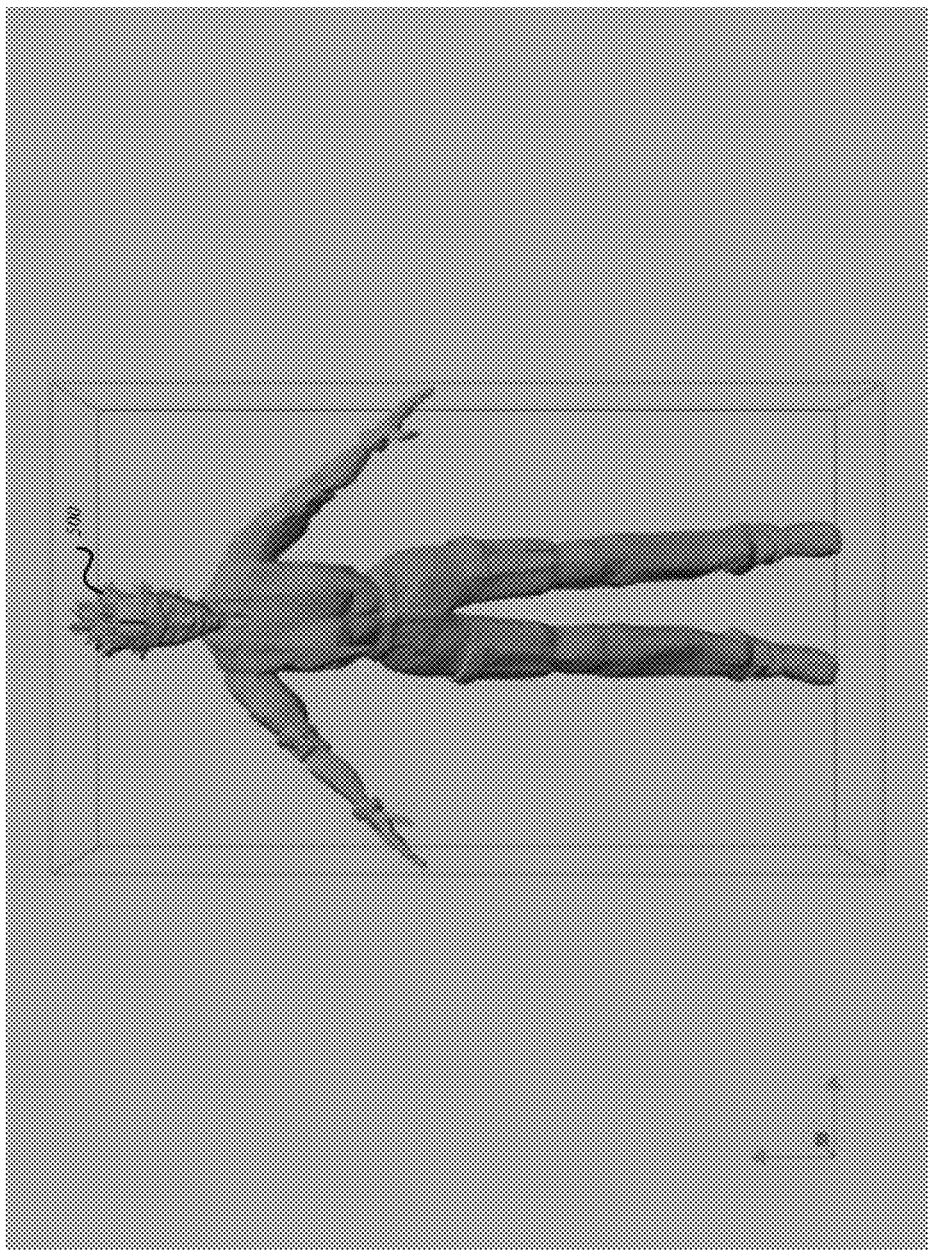

FIG. 5B illustrates an exemplary embodiment of object 500 after applying vertex processing and tessellation processing. In this example, graphics information may be processed by a vertex processing module 102, as discussed and vertex information may be generated. The graphics information may then be processed by a tessellation processing module 104. For example, the tessellation processing module 104 may subdivide one or more polygons, triangles or shapes created by the vertices to make additional, smaller polygons to provide more detail for the object. Once the object 500 is processed by the tessellation processing module 104 and tessellation information is generated, the graphics information may then passed through a pseudo-geometry module 206 and displayed as shown in FIG. 5B.

Figure 5C:
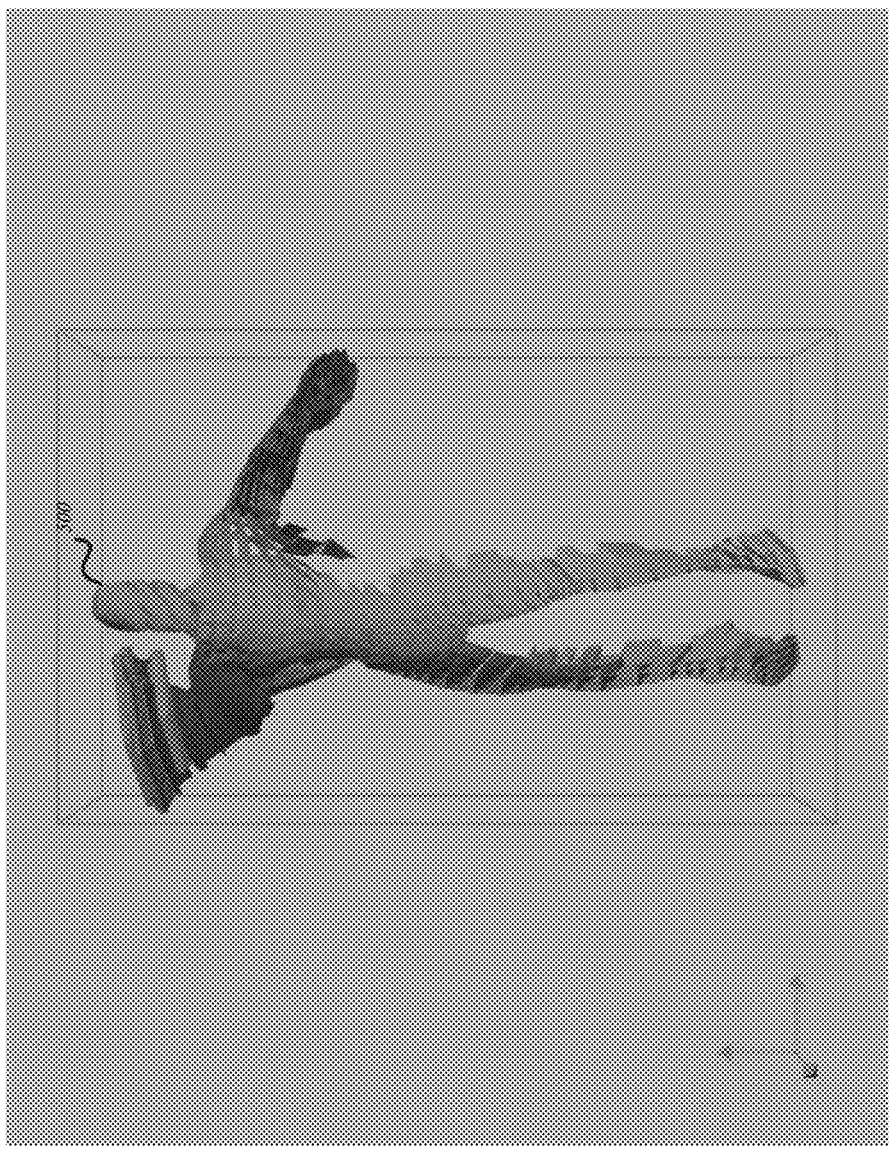

FIG. 5C illustrates an exemplary embodiment of object 500 after applying vertex processing, tessellation processing and geometry processing. In this example, graphics information may be processed by a vertex processing module 102, and an optional tessellation processing module 104 as discussed above, and vertex and tessellation information may be generated. The graphics information may then be processed by a geometry processing module 106. For example, geometry processing may be applied to object 500 to generate a blurring effect. Once the object 500 is processed by the geometry processing module 106 and geometry information is generated, the geometry information may be displayed as shown in FIG. 5C.

FIG. 6 illustrates one embodiment of a third logic flow 600. The logic flow 600 may be representative of some or all of the operations executed by one or more embodiments described herein. For example, the logic flow 600 may illustrate operations performed by graphics processing pipeline 100 and 200, system 700 and, more particularly, computing system 705 of system 700, and system 800. In the illustrated embodiment shown in FIG. 6, the logic flow 600 may include receiving graphics information in a graphics processing stream at block 605. The graphics information may be received by one or more processing modules executing on a graphics processing unit or processing circuit. In some embodiments, a vertex processing module may receive the graphics information from an application. The graphics information may include information for processing of an object by the graphics processing stream through a graphics processing pipeline.

In various embodiments, at block 610 the logic flow 600 may include applying vertex processing to the graphics information in the graphics processing stream to generate vertex information. For example, a vertex processing module may be used to manipulate objects in a 3D environment or space by performing mathematical operations on the objects' graphics information to generate the vertex information Logic flow 600 may also include identifying vertex information associated with the graphics processing stream based on one or more identifiers at block 615. The vertex information may be identified by either a pseudo-tessellation processing module and/or a pseudo-geometry processing by tags or indicators associated with vertex information. Further, at block 620, logic flow 600 may also include displaying the vertex information from the graphics processing stream on a display. The vertex information may be sent to a buffer via a stream output stage or command and a display controller may read to buffer to display the vertex information on the display.

Figure 7:
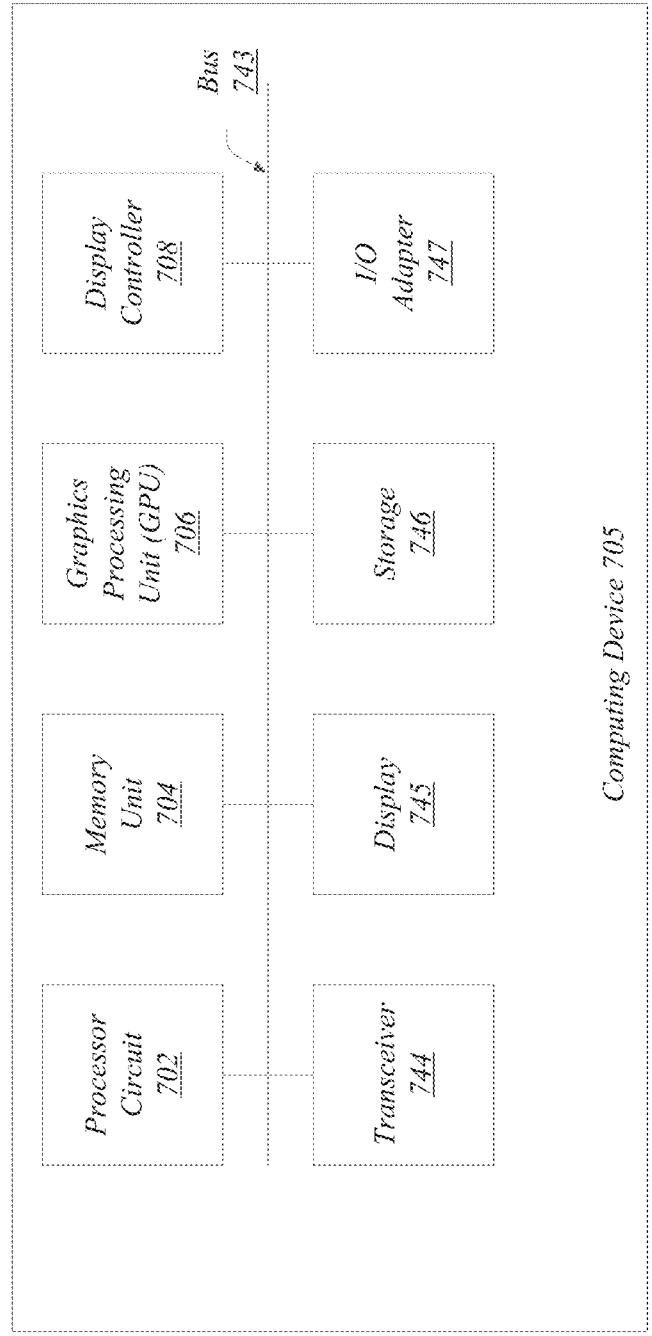
FIG. 7 illustrates an embodiment of a first computing system.

FIG. 7 illustrates one embodiment of a system 700. In various embodiments, system 700 may be representative of a system or architecture suitable for use with one or more embodiments described herein, such as graphics processing pipeline 100, 200, logic flows 300 of FIG. 3, logic flow 400 of FIG. 4, and/or logic flow 600 of FIG. 6. The embodiments are not limited in this respect.

As shown in FIG. 7, system 700 may include multiple elements. One or more elements may be implemented using one or more circuits, components, registers, processors, software subroutines, modules, or any combination thereof, as desired for a given set of design or performance constraints. Although FIG. 7 shows a limited number of elements in a certain topology by way of example, it can be appreciated that more or less elements in any suitable topology may be used in system 700 as desired for a given implementation. The embodiments are not limited in this context.

In various embodiments, system 700 may include a computing device 705 which may be any type of computer or processing device including a personal computer, desktop computer, tablet computer, netbook computer, notebook computer, laptop computer, server, server farm, blade server, or any other type of server, and so forth.

In various embodiments, computing device 705 may include processor circuit 702. Processor circuit 702 may be implemented using any processor or logic device. The processing circuit 702 may be one or more of any type of computational element, such as but not limited to, a microprocessor, a processor, central processing unit, digital signal processing unit, dual core processor, mobile device processor, desktop processor, single core processor, a system-on-chip (SoC) device, complex instruction set computing (CISC) microprocessor, a reduced instruction set (RISC) microprocessor, a very long instruction word (VLIW) microprocessor, or any other type of processor or processing circuit on a single chip or integrated circuit. The processing circuit 702 may be connected to and communicate with the other elements of the computing system via an interconnect 743, such as one or more buses, control lines, and data lines.

In one embodiment, computing device 705 may include a memory unit 704 to couple to processor circuit 702. Memory unit 704 may be coupled to processor circuit 702 via communications bus 743, or by a dedicated communications bus between processor circuit 702 and memory unit 704, as desired for a given implementation. Memory unit 04 may be implemented using any machine-readable or computer-readable media capable of storing data, including both volatile and non-volatile memory. In some embodiments, the machine-readable or computer-readable medium may include a non-transitory medium. The embodiments are not limited in this context.

Computing device 705 may include a graphics processing unit (GPU) 706, in various embodiments. The GPU 706 may include any processing unit, logic or circuitry optimized to perform graphics-related operations as well as the video decoder engines and the frame correlation engines. The GPU 706 may be used to render 2-dimensional (2-D) and/or 3-dimensional (3-D) images for various applications such as video games, graphics, computer-aided design (CAD), simulation and visualization tools, imaging, etc. Various embodiments are not limited in this manner; GPU 706 may process any type of graphics data such as pictures, videos, programs, animation, 3D, 2D, objects images and so forth.

In some embodiments, computing device 705 may include a display controller 708. Display controller 708 may be any type of processor, controller, circuit, logic, and so forth for processing graphics information and displaying the graphics information. The display controller 708 may receive or retrieve graphics information from one or more buffers, such as buffer(s) 220. After processing the information, the display controller 708 may send the graphics information to a display.

In various embodiments, system 700 may include a transceiver 744. Transceiver 744 may include one or more radios capable of transmitting and receiving signals using various suitable wireless communications techniques. Such techniques may involve communications across one or more wireless networks. Exemplary wireless networks include (but are not limited to) wireless local area networks (WLANs), wireless personal area networks (WPANs), wireless metropolitan area network (WMANs), cellular networks, and satellite networks. In communicating across such networks, transceiver 744 may operate in accordance with one or more applicable standards in any version. The embodiments are not limited in this context.

In various embodiments, computing device 705 may include a display 745. Display 745 may constitute any display device capable of displaying information received from processor circuit 702, graphics processing unit 706 and display controller 708.

In various embodiments, computing device 705 may include storage 746. Storage 746 may be implemented as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In embodiments, storage 746 may include technology to increase the storage performance enhanced protection for valuable digital media when multiple hard drives are included, for example. Further examples of storage 746 may include a hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of DVD devices, a tape device, a cassette device, or the like. The embodiments are not limited in this context.

In various embodiments, computing device 705 may include one or more I/O adapters 747. Examples of I/O adapters 747 may include Universal Serial Bus (USB) ports/adapters, IEEE 1394 Firewire ports/adapters, and so forth. The embodiments are not limited in this context.

Figure 8:
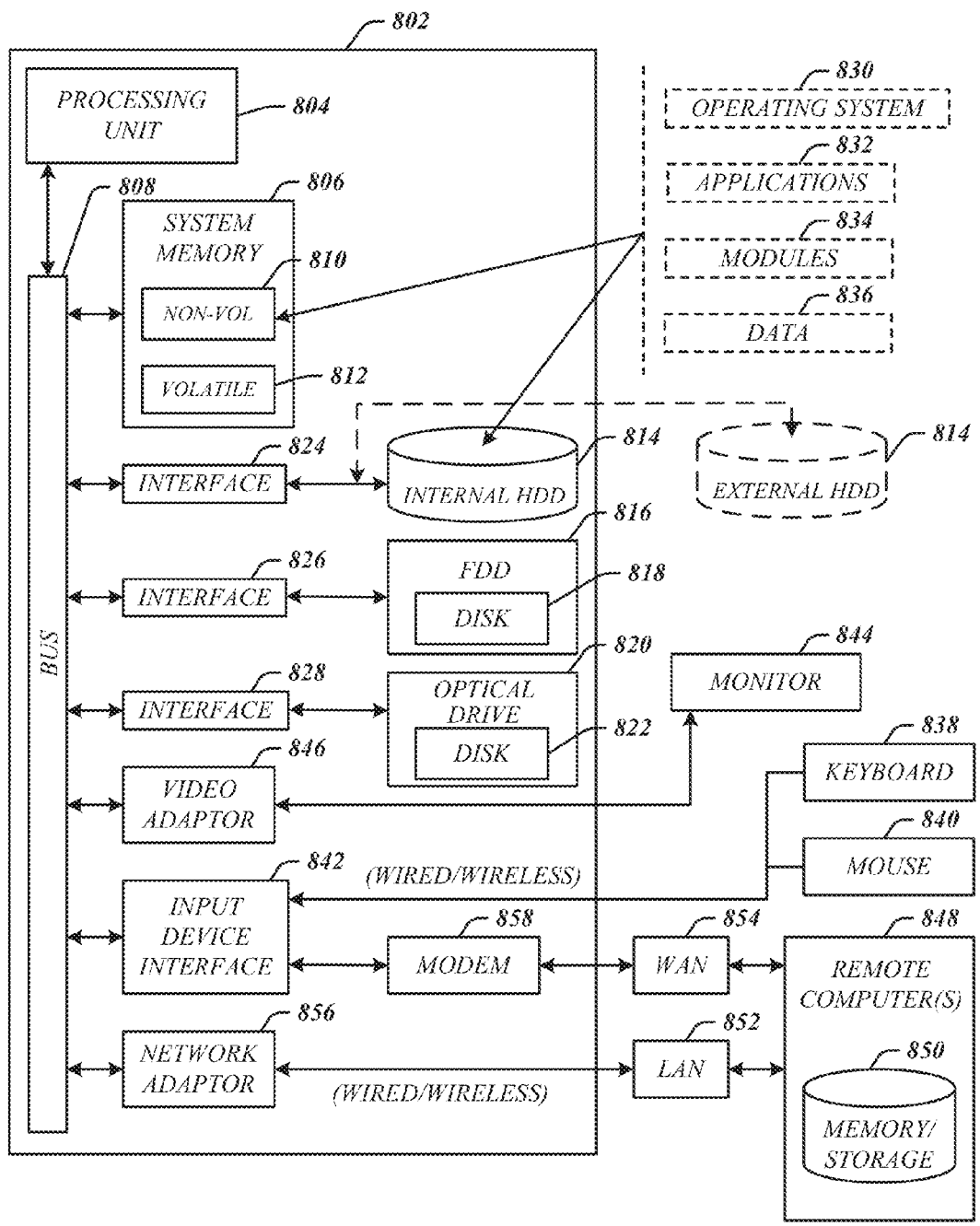
FIG. 8 illustrates an embodiment of a first computing architecture.

FIG. 8 illustrates an embodiment of an exemplary computing architecture 800 suitable for implementing various embodiments as previously described. In one embodiment, the computing architecture 800 may comprise or be implemented as part of computing device 705 and graphics processing pipeline 100, 200.

As used in this application, the terms "system" and "component" are intended to refer to a computer-related entity, either hardware, a combination of hardware and software, software, or software in execution, examples of which are provided by the exemplary computing architecture 800. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

The computing architecture 800 includes various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth. The embodiments, however, are not limited to implementation by the computing architecture 800.

As shown in FIG. 8, the computing architecture 800 comprises a processing unit 804, a system memory 806 and a system bus 808. The processing unit 804 can be any of various commercially available processors.

The system bus 808 provides an interface for system components including, but not limited to, the system memory 806 to the processing unit 804. The system bus 808 can be any of several types of bus structure that may further interconnect to a memory bus (with or without a memory controller), a peripheral bus, and a local bus using any of a variety of commercially available bus architectures. Interface adapters may connect to the system bus 808 via slot architecture. Example slot architectures may include without limitation Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and the like.

The computing architecture 800 may comprise or implement various articles of manufacture. An article of manufacture may comprise a computer-readable storage medium to store logic. Examples of a computer-readable storage medium may include any tangible media capable of storing electronic data, including volatile memory or non-volatile memory, removable or non-removable memory, erasable or non-erasable memory, writeable or re-writeable memory, and so forth. Examples of logic may include executable computer program instructions implemented using any suitable type of code, such as source code, compiled code, interpreted code, executable code, static code, dynamic code, object-oriented code, visual code, and the like. Embodiments may also be at least partly implemented as instructions contained in or on a non-transitory computer-readable medium, which may be read and executed by one or more processors to enable performance of the operations described herein.

The system memory 806 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In the illustrated embodiment shown in FIG. 8, the system memory 806 can include non-volatile memory 810 and/or volatile memory 812. A basic input/output system (BIOS) can be stored in the non-volatile memory 810.

The computer 802 may include various types of computer-readable storage media in the form of one or more lower speed memory units, including an internal (or external) hard disk drive (HDD) 814, a magnetic floppy disk drive (FDD) 816 to read from or write to a removable magnetic disk 818, and an optical disk drive 820 to read from or write to a removable optical disk 822 (e.g., a CD-ROM or DVD). The HDD 814, FDD 816 and optical disk drive 820 can be connected to the system bus 808 by a HDD interface 824, an FDD interface 826 and an optical drive interface 828, respectively. The HDD interface 824 for external drive implementations can include at least one or both of Universal Serial Bus (USB) and IEEE 1394 interface technologies.

The drives and associated computer-readable media provide volatile and/or nonvolatile storage of data, data structures, computer-executable instructions, and so forth. For example, a number of program modules can be stored in the drives and memory units 810, 812, including an operating system 830, one or more application programs 832, other program modules 834, and program data 836. In one embodiment, the one or more application programs 832, other program modules 834, and program data 836 can include, for example, the various applications and/or components of the system 700.

A user can enter commands and information into the computer 802 through one or more wire/wireless input devices, for example, a keyboard 838 and a pointing device, such as a mouse 840. Other input devices may include microphones, infra-red (IR) remote controls, radio-frequency (RF) remote controls, game pads, stylus pens, card readers, dongles, finger print readers, gloves, graphics tablets, joysticks, keyboards, retina readers, touch screens (e.g., capacitive, resistive, etc.), trackballs, track pads, sensors, styluses, and the like. These and other input devices are often connected to the processing unit 804 through an input device interface 842 that is coupled to the system bus 808, but can be connected by other interfaces such as a parallel port, IEEE 1394 serial port, a game port, a USB port, an IR interface, and so forth.

A monitor 844 or other type of display device is also connected to the system bus 808 via an interface, such as a video adaptor 846. The monitor 844 may be internal or external to the computer 802. In addition to the monitor 844, a computer typically includes other peripheral output devices, such as speakers, printers, and so forth.

The computer 802 may operate in a networked environment using logical connections via wire and/or wireless communications to one or more remote computers, such as a remote computer 848. The remote computer 848 can be a workstation, a server computer, a router, a personal computer, portable computer, microprocessor-based entertainment appliance, a peer device or other common network node, and typically includes many or all of the elements described relative to the computer 802, although, for purposes of brevity, only a memory/storage device 850 is illustrated. The logical connections depicted include wire/wireless connectivity to a local area network (LAN) 852 and/or larger networks, for example, a wide area network (WAN) 854. Such LAN and WAN networking environments are commonplace in offices and companies, and facilitate enterprise-wide computer networks, such as intranets, all of which may connect to a global communications network, for example, the Internet.

When used in a LAN networking environment, the computer 802 is connected to the LAN 852 through a wire and/or wireless communication network interface or adaptor 856. The adaptor 856 can facilitate wire and/or wireless communications to the LAN 852, which may also include a wireless access point disposed thereon for communicating with the wireless functionality of the adaptor 856.

When used in a WAN networking environment, the computer 802 can include a modem 858, or is connected to a communications server on the WAN 854, or has other means for establishing communications over the WAN 854, such as by way of the Internet. The modem 858, which can be internal or external and a wire and/or wireless device, connects to the system bus 808 via the input device interface 842. In a networked environment, program modules depicted relative to the computer 802, or portions thereof, can be stored in the remote memory/storage device 850. It will be appreciated that the network connections shown are exemplary and other means of establishing a communications link between the computers can be used.

The computer 802 is operable to communicate with wire and wireless devices or entities using the IEEE 802 family of standards, such as wireless devices operatively disposed in wireless communication (e.g., IEEE 802.11 over-the-air modulation techniques). This includes at least Wi-Fi (or Wireless Fidelity), WiMax, and Bluetooth™ wireless technologies, among others. Thus, the communication can be a predefined structure as with a conventional network or simply an ad hoc communication between at least two devices. Wi-Fi networks use radio technologies called IEEE 802.11x (a, b, g, n, etc.) to provide secure, reliable, fast wireless connectivity. A Wi-Fi network can be used to connect computers to each other, to the Internet, and to wire networks (which use IEEE 802.3-related media and functions).

The various elements of the graphics processing pipeline 100, 200 as previously described with reference to FIGS. 1-8 may comprise various hardware elements, software elements, or a combination of both. Examples of hardware elements may include devices, logic devices, components, processors, microprocessors, circuits, processors, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. However, determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

The detailed disclosure now turns to providing examples that pertain to further embodiments. Examples one through thirty-two (1-32) provided below are intended to be exemplary and non-limiting.

In a first example, an apparatus or computing device to process a graphics processing stream may include a processing unit, a vertex processing module for execution on the processing unit to receive graphics information in a graphics processing stream, and apply vertex processing to the graphics information in the graphics processing stream to generate vertex information. The apparatus may also include a pseudo-geometry processing module for execution on the processing circuit to identify vertex information associated with the graphics processing stream based on one or more identifiers, and send the identified vertex information from the graphics processing stream to a buffer for a display controller.

In a second example and in furtherance the first example, an apparatus or computing device may include a tessellation processing module for execution on the processing circuit to apply tessellation processing to the graphics information including the vertex information in the graphics processing stream to generate tessellation information. The apparatus or computing device may also include the pseud-geometry processing module for execution on the processing circuit to identify the tessellation information associated with the graphics processing stream based on one or more identifiers, and to present the identified tessellation information from the graphics processing stream on a display.

In a third example and in furtherance of any of the previous examples, an apparatus or computing device may include a geometry processing module for execution on the processing circuit to apply geometry processing to the graphics information including the vertex information and the tessellation information in the graphics processing stream to generate geometry information, and identify the geometry information associated with graphics processing stream based on one or more identifier, and the display to present the identified geometry information from the graphics processing stream.

In a fourth example and in furtherance of any of the previous examples, an apparatus or computing device may include a geometry processing module for execution on the processing circuit to apply geometry processing to the graphics information including vertex information in the graphics processing stream to generate geometry information and identify the geometry information associated with graphics processing stream based on one or more identifiers, and a display to present the identified geometry information from the graphics processing stream In a fifth example and in furtherance of any of the previous examples, the pseudo-geometry processing module to the display controller to read the buffer to display the identified vertex information on the display as a graphical image and a display to present the identified vertex information from the graphics processing stream.

In a sixth example and in furtherance of any of the previous examples, an apparatus or computing device may include a pseudo-tessellation processing module for execution on the processing circuit to identify the vertex information and to pass the identified vertex information through to the pseudo-geometry processing.

In a seventh example and in furtherance of any of the previous examples, the pseudo-geometry processing module to send the identified tessellation information to a buffer and an apparatus may include a display controller to read the buffer to present the identified tessellation information on the display as a graphical image In an eighth example and in furtherance of any of the previous examples, the graphics information comprising one or more of point data, line data, plane data, circle data, triangle data, spline curve data, hue data, and color data.

In a ninth example and in furtherance of any of the previous examples, a computer-implemented method may include receiving, by a processing circuit, graphics information in a graphics processing stream, applying vertex processing to the graphics information in the graphics processing stream to generate vertex information, identifying vertex information associated with the graphics processing stream based on one or more identifiers, and sending the identified vertex information from the graphics processing stream on a buffer for a display controller.

In a tenth example and in furtherance of any of the previous examples, a computer-implemented method may include applying tessellation processing to the graphics information including the vertex information in the graphics processing stream to generate tessellation information, identifying the tessellation information associated with the graphics processing stream based on one or more identifiers and presenting the identified tessellation information from the graphics processing stream on the display.

In an eleventh example and in furtherance of any of the previous examples, a computer-implemented method may include applying geometry processing to the graphics information including the vertex information and the tessellation information in the graphics processing stream to generate geometry information, identifying the geometry information associated with graphics processing stream based on one or more identifiers and presenting the identified geometry information from the graphics processing stream on the display.

In a twelfth example and in furtherance of any of the previous examples, a computer-implemented method may include applying geometry processing to the graphics information including vertex information in the graphics processing stream to generate geometry information, identifying the geometry information associated with graphics processing stream based on one or more identifiers and presenting the identified geometry information from the graphics processing stream on the display.

In a thirteenth example and in furtherance of any of the previous examples, a computer-implemented method may include sending the identified vertex information to a buffer by a pseudo-geometry processing module, and reading the buffer to present the identified vertex information on the display as a graphical image.

In a fourteenth example and in furtherance of any of the previous examples, a computer-implemented may include passing the identified vertex information through one or more pseudo-tessellation processing modules prior sending the identified vertex information to the buffer.

In a fifteenth example and in furtherance of any of the previous examples, a computer-implemented method may include sending the identified tessellation information to a buffer by a pseudo-geometry processing module, and reading the buffer to present the identified tessellation information on the display as a graphical image.

In a sixteenth example and in furtherance of any of the previous examples, a computer-implemented method may the graphics information comprising one or more of point data, line data, plane data, circle data, triangle data, spline curve data, hue data, and color data.

In a seventeenth example and in furtherance of any of the previous examples, an article may include a computer-readable storage medium containing a plurality of instructions that when executed enable a computing device to receive graphics information in a graphics processing stream, apply vertex processing to the graphics information in the graphics processing stream to generate vertex information, identify vertex information associated with the graphics processing stream based on one or more identifiers, and send the identified vertex information from the graphics processing stream to a buffer for a display controller.

In a eighteenth example and in furtherance of any of the previous examples, an article may include instructions that when executed enable the computing device to apply tessellation processing to the graphics information including the vertex information in the graphics processing stream to generate tessellation information, identify the tessellation information associated with the graphics processing stream based on one or more identifiers and present the identified tessellation information from the graphics processing stream on the display.

In a nineteenth example and in furtherance of any of the previous examples, an article may include instructions that when executed enable the computing device to apply geometry processing to the graphics information including the vertex information and the tessellation information in the graphics processing stream to generate geometry information, identify the geometry information associated with graphics processing stream based on one or more identifiers and present the identified geometry information from the graphics processing stream on the display.

In a twentieth example and in furtherance of any of the previous examples, an article may include instructions that when executed enable the computing device to apply geometry processing to the graphics information including vertex information in the graphics processing stream to generate geometry information, identify the geometry information associated with graphics processing stream based on one or more identifiers, and present the identified geometry information from the graphics processing stream on the display.

In a twenty-first example and in furtherance of any of the previous examples, an article may include instructions that when executed enable the computing device to read the buffer to present the identified vertex information on the display as a graphical image and present the identified vertex information from the graphics processing stream on the display.

In a twenty-second example and in furtherance of any of the previous examples, an article may include instructions that when executed enable the computing device to pass the identified vertex information through one or more pseudo-tessellation processing modules prior sending the identified vertex information to the buffer.

In a twenty-third example and in furtherance of any of the previous examples, an article may include instructions that when executed enable the computing device to send the identified tessellation information to a buffer by a pseudo-geometry processing module and read the buffer to present the identified tessellation information on the display as a graphical image.

In a twenty-fourth example and in furtherance of any of the previous examples, an article may include instructions that when executed enable the computing device to include the graphics information comprising one or more of point data, line data, plane data, circle data, triangle data, spline curve data, hue data, and color data.

In a twenty-fifth example and in furtherance of any of the previous examples, an apparatus may comprise means for receiving graphics information in a graphics processing stream, and apply vertex processing to the graphics information in the graphics processing stream to generate vertex information, means for identifying vertex information associated with the graphics processing stream based on one or more identifiers and means for sending the identified vertex information from the graphics processing stream to a buffer.

In a twenty-sixth example and in furtherance of any of the previous examples, an apparatus may comprise means for applying tessellation processing to the graphics information including the vertex information in the graphics processing stream to generate tessellation information, means for identifying the tessellation information associated with the graphics processing stream based on one or more identifiers and means for presenting the identified tessellation information from the graphics processing stream.

In a twenty-seventh example and in furtherance of any of the previous examples, an apparatus may comprise means for applying geometry processing to the graphics information including the vertex information and the tessellation information in the graphics processing stream to generate geometry information, means for identifying the geometry information associated with graphics processing stream based on one or more identifiers and means for displaying the identified geometry information from the graphics processing stream.

In a twenty-eighth example and in furtherance of any of the previous examples, an apparatus may comprise means for applying processing to the graphics information including vertex information in the graphics processing stream to generate geometry information, means for identify the geometry information associated with graphics processing stream based on one or more identifiers and means for presenting the identified geometry information from the graphics processing stream.

In a twenty-ninth example and in furtherance of any of the previous examples, an apparatus may comprise means for reading read the buffer to present the identified vertex information on a display as a graphical image, and means for presenting the identified vertex information on a display.

In a thirtieth example and in furtherance of any of the previous examples, an apparatus may comprise means for identifying the vertex information and means for passing the identified vertex information through to the pseudo-geometry processing.

In a thirty-first example and in furtherance of any of the previous examples, an apparatus may comprise means for sending the identified tessellation information to a buffer and means for reading the buffer to present the identified tessellation information on the display as a graphical image.

In a thirty-second example and in furtherance of any of the previous examples, an apparatus may comprise graphics information comprising one or more of point data, line data, plane data, circle data, triangle data, spline curve data, hue data, and color data.

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Further, some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims.

What is claimed is:

1. An apparatus, comprising:
    a processing unit;
    a vertex processing module for execution on the processing unit to receive graphics information in a graphics processing stream, and apply vertex processing to the graphics information in the graphics processing stream to generate vertex information;
    a geometry processing module for execution on the processing unit to apply geometry processing to the graphics information including vertex information in the graphics processing stream to generate geometry information; and
    a pseudo-geometry processing module for execution on the processing unit to replace the geometry processing module in response to an error in the vertex processing to identify vertex information associated with the graphics processing stream based on one or more identifiers and send the identified vertex information from the graphics processing stream to a buffer for a display controller.

2. The apparatus of claim 1, comprising:
    a tessellation processing module for execution on the processing unit to apply tessellation processing to the graphics information including the vertex information in the graphics processing stream to generate tessellation information;
    the pseudo-geometry processing module to replace the geometry processing module in response to an error in the tessellation processing to identify the tessellation information associated with the graphics processing stream based on one or more identifiers; and
    a display to present the identified tessellation information from the graphics processing stream.

3. The apparatus of claim 2, the geometry processing module to apply geometry processing to the tessellation information in the graphics processing stream to generate the geometry information, and identify the geometry information associated with graphics processing stream based on one or more identifiers, and the apparatus comprising a display to present the identified geometry information from the graphics processing stream.

4. The apparatus of claim 2, the pseudo-geometry processing module to send the identified tessellation information to the buffer, and the display controller to read the buffer to present the identified tessellation information on the display as a graphical image.

5. The apparatus of claim 1, the geometry processing module to identify the geometry information associated with graphics processing stream based on one or more identifiers, and the apparatus comprising a display to present the identified geometry information from the graphics processing stream.

6. The apparatus of claim 1, the display controller to read the buffer to present the identified vertex information on the display as a graphical image, and the apparatus comprising a display to present the identified vertex information from the graphics processing stream.

7. The apparatus of claim 1, comprising:
a pseudo-tessellation processing module for execution on the processing unit to replace a tessellation processing module in response to the error in the vertex processing to identify the vertex information and to pass the identified vertex information through to the pseudo-geometry processing module.

8. The apparatus of claim 1, the graphics information comprising one or more of point data, line data, plane data, circle data, triangle data, spline curve data, hue data, and color data.

9. A computer-implemented method, comprising:
receiving, by a processing unit, graphics information in a graphics processing stream;
applying vertex processing to the graphics information in the graphics processing stream to generate vertex information;
executing, by the processing unit, a geometry processing module to apply geometry processing to the graphics information including the vertex information in the graphics processing stream to generate geometry information; and
in response to an error in applying vertex processing, replacing the geometry processing module with a pseudo-geometry processing module to forego the application of geometry processing to the graphics information, identify vertex information associated with the graphics processing stream based on one or more identifiers, and send the identified vertex information from the graphics processing stream to a buffer for a display controller.

10. The computer-implemented method of claim 9, comprising:
executing, by the processing unit, a tessellation processing module to apply tessellation processing to the graphics information including the vertex information in the graphics processing stream to generate tessellation information; and
in response to an error in applying tessellation processing, replacing the geometry processing module with the pseudo-geometry processing module to identify the tessellation information associated with the graphics processing stream based on one or more identifiers, and present the identified tessellation information from the graphics processing stream on a display.

11. The computer-implemented method of claim 10, comprising:
applying geometry processing to the tessellation information in the graphics processing stream to generate the geometry information;
identifying the geometry information associated with graphics processing stream based on one or more identifiers; and
presenting the identified geometry information from the graphics processing stream on a display.

12. The computer-implemented method of claim 10, comprising, in response to the error in applying tessellation processing, sending the identified tessellation information to the buffer by the pseudo-geometry processing module, and reading the buffer to present the identified tessellation information on the display as a graphical image.

13. The computer-implemented method of claim 9, comprising:
identifying the geometry information associated with graphics processing stream based on one or more identifiers; and
presenting the identified geometry information from the graphics processing stream on a display.

14. The computer-implemented method of claim 9, comprising:
reading the buffer to present the identified vertex information on a display as a graphical image; and
presenting the identified vertex information from the graphics processing stream on the display.

15. The computer-implemented method of claim 14, comprising in response to the error in applying vertex processing, foregoing execution of one or more tessellation processing modules to apply tessellation processing to the graphics information, and passing the identified vertex information through one or more pseudo-tessellation processing modules prior sending the identified vertex information to the buffer.

16. The computer-implemented method of claim 9, the graphics information comprising one or more of point data, line data, plane data, circle data, triangle data, spline curve data, hue data, and color data.

17. An article comprising a non-transitory computer-readable storage medium containing a plurality of instructions that when executed enable a computing device to:
receive graphics information in a graphics processing stream;
apply vertex processing to the graphics information in the graphics processing stream to generate vertex information;
execute a geometry processing module to apply geometry processing to the graphics information including the vertex information in the graphics processing stream to generate geometry information; and
in response to an error in the vertex processing, replace the geometry processing module with a pseudo-geometry processing module to forego the application of geometry processing to the graphics information, identify vertex information associated with the graphics processing stream based on one or more identifiers, and send the identified vertex information from the graphics processing stream to a buffer for a display controller.

18. The article of claim 17, comprising instructions that when executed enable the computing device to:
execute a tessellation processing module to apply tessellation processing to the graphics information including the vertex information in the graphics processing stream to generate tessellation information; and in response to an error in the tessellation processing, replace the geometry processing module with the pseudo-geometry processing module to identify the tessellation information associated with the graphics processing stream based on one or more identifiers, and present the identified tessellation information from the graphics processing stream on a display.

19. The article of claim 18, comprising instructions that when executed enable the computing device to:

apply geometry processing to the tessellation information in the graphics processing stream to generate the geometry information;

identify the geometry information associated with graphics processing stream based on one or more identifiers; and present the identified geometry information from the graphics processing stream on a display.

20. The article claim 18, comprising instructions that when executed enable the computing device to, in response to the error in the tessellation processing, send the identified tessellation information to the buffer by the pseudo-geometry processing module and read the buffer to present the identified tessellation information on the display as a graphical image.

21. The article of claim 17, comprising instructions that when executed enable the computing device to:

identify the geometry information associated with graphics processing stream based on one or more identifiers; and present the identified geometry information from the graphics processing stream on a display.

22. The article of claim 17, comprising instructions that when executed enable the computing device to:

read the buffer to present the identified vertex information on the display as a graphical image; and present the identified vertex information from the graphics processing stream on the display.

23. The article of claim 22, comprising instructions that when executed enable the computing device to in response to the error in the vertex processing, forego execution of one or more tessellation processing modules to apply tessellation processing to the graphics information, and pass the identified vertex information through one or more pseudo-tessellation processing modules prior sending the identified vertex information to the buffer.

24. The article of claim 17, the graphics information comprising one or more of point data, line data, plane data, circle data, triangle data, spline curve data, hue data, and color data.

* * * * *